April 15, 1952
D. L. SPRUNG
2,592,702
ARMREST
Filed Aug. 29, 1949
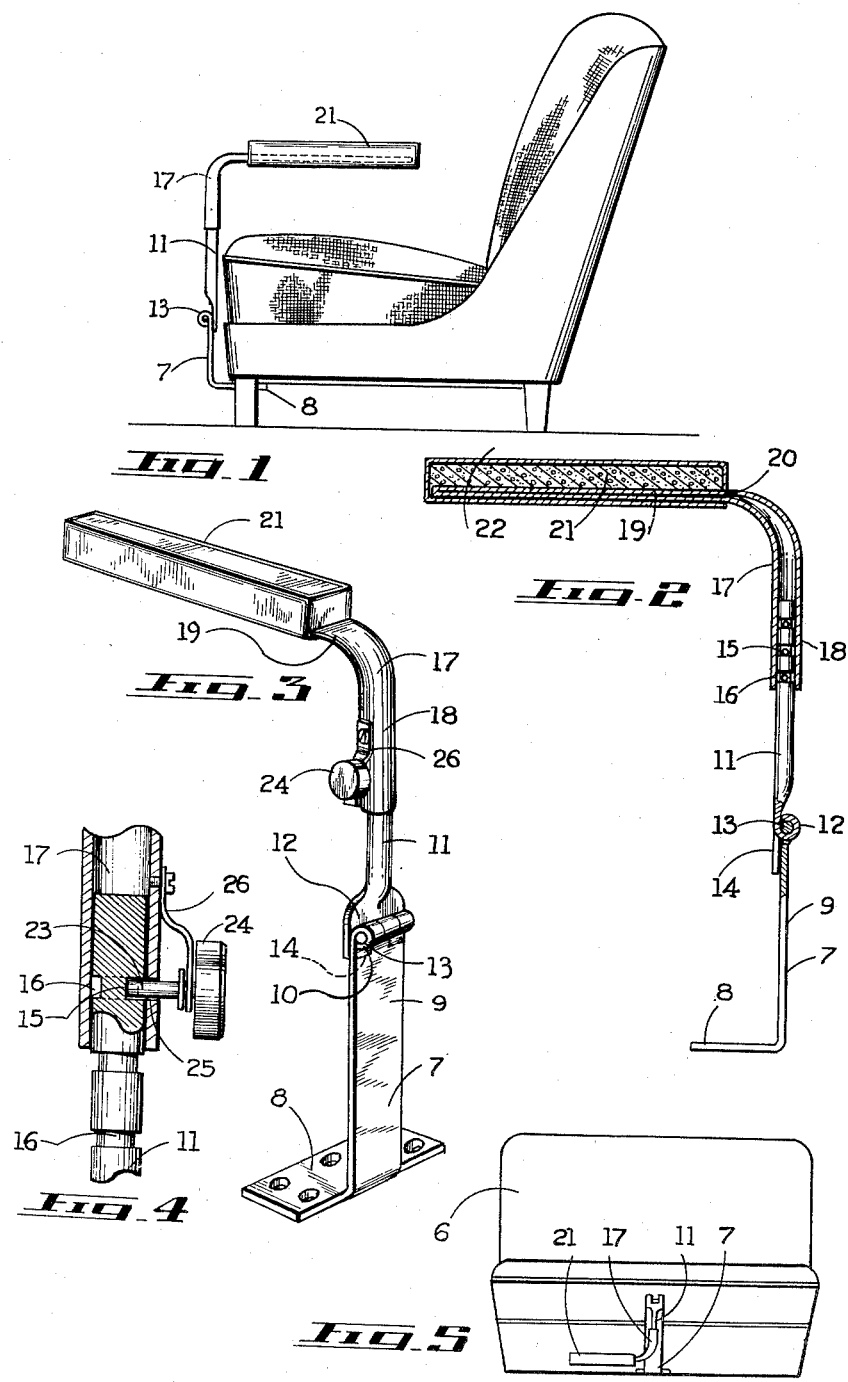
Inventor
DOUGLAS LOWRY SPRUNG
by
Attorney.

Patented Apr. 15, 1952

2,592,702

UNITED STATES PATENT OFFICE 2,592,702

ARMREST

Douglas Lowry Sprung, Montreal, Quebec, Canada

Application August 29, 1949, Serial No. 112,865

4 Claims. (Cl. 155—112)

This invention relates to certain new and useful improvements in an arm rest and appertains particularly to one for automobiles and the like.

An object of the invention is to provide an automobile arm rest that may be easily and quickly folded away when not in use.

Another object of the invention is to provide an arm rest that may be readily adjusted to the desired height to suit the individual user.

Another object of the invention is to provide an arm rest suitable for simple attachment to an automobile already in use as well as for current production.

A still further object of the invention is the provision of a fold-away type of automobile arm rest that is comfortable, compact and durable; characterized by structural simplicity and capable of manufacture at reasonable cost whereby the same is rendered commercially desirable.

To the accomplishment of these and related objects as shall become apparent as the description proceeds, the invention resides in the construction, combination and arrangement of parts as shall be hereinafter more fully described, illustrated in the accompanying drawings, and pointed out in the claims hereunto appended.

The invention will be best understood and can be more clearly described when reference is had to the drawings forming a part of this disclosure wherein like characters indicate like parts throughout the several views.

In the drawings:

Figure 1 is a side elevation of a conventional motor car seat with my fold-away arm rest attached and in position for use;

Figure 2 is an enlarged side elevation of the arm rest alone, with the upper frame member and cushion shown in section;

Figure 3 is a perspective view thereof;

Figure 4 is an enlarged sectional elevation detail of the telescopic coupling of two of the frame pieces; and Figure 5 is a small front elevation of a usual type of rear seat with the arm rest shown in folded-away position.

The need for an arm rest is often felt by motorists, particularly the driver who makes extended trips, but heretofore it has not been customary to provide one for the inside arm as it was preferred to keep the centre of the seat clear to allow free entry from and exit to both sides of the vehicle.

The present invention now affords an arm rest suitable for middle or "inside" use in either front or back seat and being readily foldable out of the way still allows of an unobstructed seat for the full width thereof, if and when desired.

As shown applied to conventional type automobile seats 6 in Figures 1 and 5, this novel arm rest is seen to include a mounting bracket 7 having a base plate 8 to be inserted under and screwed to the frame of the seat 6 and at a right angle thereto a flat stem 9 rising about half way up the front of the seat and terminally rolled forwards and notched in a hinge part 10.

The arm rest proper, carried by this bracket is a two-part telescopic support comprising an inner or lower cylindrical post part 11 widened, flattened and rolled at its lower end into a companion hinge part 12, pivotally connected to the top of the bracket 7 by a horizontal, transversely extending hinge pin 13, and provided thereat with a depending finger 14 that serves as a stop to limit the rearward hinging of the post at or near the vertical. This post part 11 has a series of vertically spaced seats 15 or, better still, a plurality of annular grooves 16 extending circumferentially of the post, from the base of each of which a deeper cavity or seat 15 continues radially inwards.

An upper or outer support part telescoping on the post 11 is an L-shaped hollow tubular piece 17, the inner arm 18 of which slides over the post 11 while the outer arm 19 lying at substantially a right angle to the first-mentioned arm is compressed vertically to provide a relatively wide flat upper surface 20 on which a cushion 21 of sponge rubber or the like is suitably secured as by adhesive and covered with a wrapping 22 of fabric, leatherette or the like.

On the inner telescopic tubular arm 18, near its lower end, a releasable coupling is located. This preferably takes the form of a pin 23, passing radially through a perforation 24 in the tube wall, with an enlarged head 25 on its outer end and leaf spring 26 mounted on the tube pressing the pin inwardly. The pin may be retracted to clear the post 11 and allow of the free telescoping or relative sliding of the post and tube parts of the support, or released to drop into the annular groove 16 at a chosen level and the L-shaped tubular member rotated until the pin seats in the cavity 15 thereof to lock the outer arm rest part against rotative as well as sliding movement.

Preferably the vertically spaced seats 15 in the post 11 occur on the right side of the post and the pin 23 accordingly placed on the corresponding side of the tubular arm 18 of the L-shaped member to hold its cushioned arm 19 extending rearwardly in a horizontal position above the seat 6 when the telescopic parts of the arm rest are pin-locked and the post is in fully hinged position with the stop 14 engaging the rear of the bracket stem.

It will be apparent that the height of the arm rest may be adjusted by releasing the pin 23 and raising or lowering the L-shaped member to let the pin seat in the desired cavity 15. When not wanted, the arm rest may be folded away by hinging the two-part support forwardly and downwardly through approximately 180 degrees and releasing the pin to swing and/or telescope the upper L-shaped member horizontally through approximately 90 degrees to either side so that the cushioned arm lies transversely along the forward edge of the seat just above the floor. In the open frame type seat 6 shown in Figure 1, the cushioned arm may swing around as much as 180 degrees to lie in a rearwardly extending position.

The telescopic design of the arm rest supports was chosen as desirable structure but any comparable pair of slidingly and rotatably related parts would suffice. Similarly, the arrangement of the hinge parts on the bracket and post could be reversed with the stop rising from the latter if so desired.

From the foregoing description taken in connection with the accompanying drawings, it will be manifest that an arm rest is provided that will fulfill all the necessary requirements of such a device, but as many changes could be made in the above description and many apparently widely different embodiments of the invention may be constructed within the scope of the appended claims, without departing from the spirit or scope thereof, it is intended that all matters contained in the said accompanying specification and drawings shall be interpreted as illustrative and not in a limitative or restrictive sense.

Having thus described the invention, what I claim as new and desire to secure by Letters Patent is:

1. An arm rest attachment for an automobile comprising a mounting bracket with a stem rising vertically therefrom; a cylindrical post vertically hinged to the top of the stem thereof and having a stop engageable with the back of the bracket's stem; an L-shaped tubular member, with one arm telescoping over said cylindrical post and releasably securable thereto against relative rotatable and sliding movement, and the other arm of said tubular member normally lying in a horizontal plane being flattened; and a cushion member secured on the upper side of the flattened arm of said tubular member.

2. An arm rest for an automobile comprising a mounting bracket for attachment to the underside of a seat at the forward edge thereof; a stem rising therefrom and extending about halfway up the front of the seat; a horizontal transversely extending hinge pin in the top of said bracket's stem; a cylindrical post vertically pivoted on said hinge pin with a stop engageable with the rest of the stem of said bracket; a telescopic extension for said post in the form of an L-shaped tubular member having its outer, normally rearwardly directed horizontal arm flattened and cushioned; and a retaining pin on said extension selectably engageable with said seats in said post at spaced levels.

3. The combination with the structure set forth in claim 2, wherein said post has a plurality of vertically spaced seats and said retaining pin on said extension passes radially through said tubular extension and is spring urged into the selected seat in said post.

4. The combination with the structure set forth in claim 2, wherein said post has a plurality of vertically spaced annular grooves, each with at least one deeper cavity extending radially inwards therefrom and said retaining pin on said extension passes radially through said tubular extension and is spring urged first into the selected groove that permits the extension to rotate but not to telescope and then into the deeper cavity where it locks the extension against both rotatable and telescopic movement.

DOUGLAS LOWRY SPRUNG.

REFERENCES CITED

The following references are of record in the file of this patent:

UNITED STATES PATENTS

| Number | Name | Date |
| --- | --- | --- |
| 651,539 | Warren | June 12, 1900 |
| 1,378,704 | McParland | May 17, 1921 |
| 1,407,174 | Simpson | Feb. 21, 1922 |
| 1,652,801 | Scully | Dec. 13, 1927 |
| 1,890,102 | Urquhart | Dec. 6, 1932 |